Aug. 21, 1923. 1,465,555
K. O. LEON
MEASURING INSTRUMENT FOR SIZING AND SORTING DISKS OR ROLLERS
Filed April 17, 1923
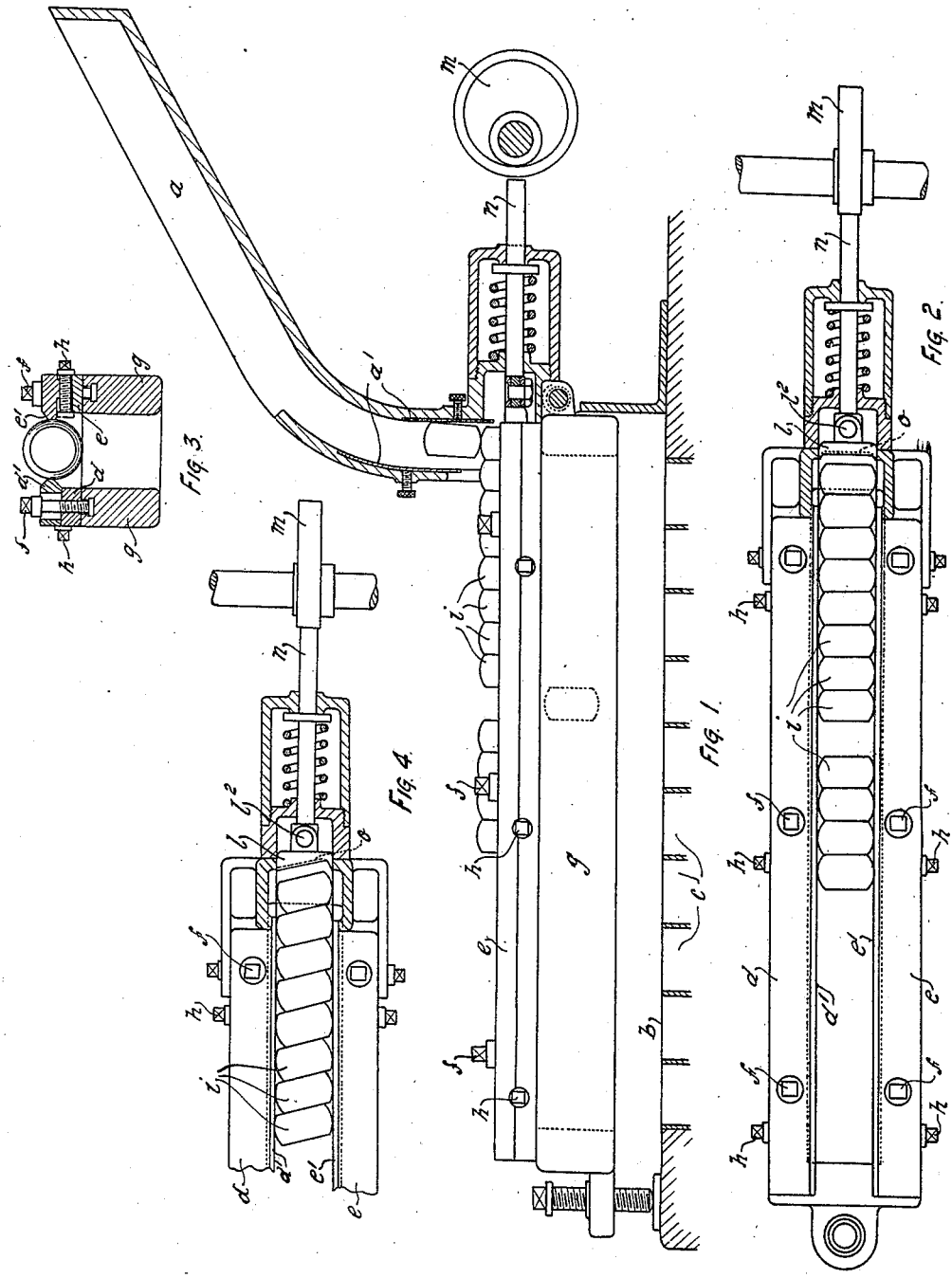

Patented Aug. 21, 1923.

1,465,555

UNITED STATES PATENT OFFICE.

KARL OSKAR LEON, OF LONDON, ENGLAND.

MEASURING INSTRUMENT FOR SIZING AND SORTING DISKS OR ROLLERS.

Application filed April 17, 1923. Serial No. 632,731.

*To all whom it may concern:*

Be it known that I, KARL OSKAR LEON, a subject of the King of Sweden, and residing at London, England, have invented a certain new and useful Improvement in Measuring Instruments for Sizing and Sorting Disks or Rollers, of which the following is a specification.

The subject of this invention is a measuring instrument for sizing and sorting disks or rollers for use in disk or roller bearings.

The instrument according to the invention, which is suitably disposed between a filling chute or the like and a receiver, comprises two metal bars, strips or the like having opposed gauging faces spaced apart and diverging towards one end, the distance apart of the bars at one or both ends being adjustable so that the disks or rollers as they are fed singly or otherwise from the filling chute between and along the gauging faces are automatically graded and fall between them into appropriate pockets of the receiver.

The invention is illustrated in the accompanying drawing in which Fig. 1 is an elevation of the instrument showing the filling chute and feeding device in section; Fig. 2 is a plan view also partly in section, the filling chute being omitted. Fig. 3 is a transverse section. Fig. 4 is a part plan view showing a modified form of the instrument suitable for sizing disks or rollers over a diameter oblique to the normal axis.

Referring to Figs. 1 to 3 of the drawing, the instrument, suitably disposed between a filling chute $a$ or the like (which may be provided with adjustable guide faces $a'$) and a receiver $b$ having a plurality of pockets $c$ into which the graded disks or rollers may fall, comprises two metal bars or strips $d$ and $e$ with opposed gauging faces $d'$, $e^t$, such faces being adjustable vertically by rotation of studs $f$ on a support $g$ and adjustable laterally by rotation of studs $h$, the bars diverging towards the end remote from the filling chute, so that the disks or rollers $i$ as they are fed from the filling chute $a$ between and along the faces $d'$, $e'$, are automatically graded and fall between the bars into pockets $c$ of the receiver corresponding to their size. For feeding the disks or rollers along the bars $d$, $e$ between the faces $d'$, $e'$ there is fitted in an extension of the filling chute a plunger $l$ or the like adapted to be reciprocated by means of an eccentric $m$ or the like acting on a spring-pressed rod $n$. The plunger proper is detachably secured to the rod $n$ by a bolt $l^2$ and is preferably formed with its face $o$ slightly undercut or arranged at an angle or otherwise to serve momentarily to tilt each disk or roller into contact with the preceding disk or roller as it is pushed forward so as to produce a small air gap between the disks and prevent them from adhering to one another. The disks, as they are fed forward, are measured by the bars over a diameter at right angles to their normal axis.

In the form shown in Fig. 4 the operative face of the plunger is inclined to the direction of movement of the disks or rollers whereby they are fed along the bars at a definite inclination to the path of travel and are measured over a diameter oblique to their normal axis.

The measuring instrument may, if desired, be subjected to a vibratory motion at one end, so as to prevent one or more of the disks or rollers from interfering with others and preventing accurate graduation.

What I claim is:—

1. A measuring instrument for sizing and sorting disks or rollers comprising a pair of bars having opposed diverging gauging surfaces and a feeding device at one end of said instrument, said device comprising a plunger, and means for imparting reciprocatory movements to said plunger in a direction parallel to the feed of the rollers.

2. A measuring instrument for sizing and sorting disks or rollers comprising a pair of bars having opposed diverging gauging surfaces, and a feeding device for feeding the disks or rollers between said bars, said device including a plunger shaped to cause the disks or rollers engaged thereby to be tilted.

3. A measuring instrument for sizing and sorting disks or rollers comprising a pair of bars having opposed diverging gauging surfaces and a feeding device for feeding the disks or rollers along and between said bars, said device including a plunger shaped to cause the disks or rollers engaged thereby to occupy a position oblique to the line of travel.

In testimony whereof I have signed my name to this specification in the presence of two subscribing witnesses.

KARL OSKAR LEON.

Witnesses:
W. R. SCOTT,
JOSEPH GEMENIL.